(12) United States Patent
Zhao et al.

(10) Patent No.: US 11,988,180 B2
(45) Date of Patent: May 21, 2024

(54) PERMANENT MAGNET-ELECTROMAGNET SYNERGISTIC COUPLING-BASED HIGH-SPEED SOLENOID VALVE WITH HIGH DYNAMIC RESPONSE AND LOW REBOUND

(71) Applicant: HARBIN ENGINEERING UNIVERSITY, Heilongjiang (CN)

(72) Inventors: Jianhui Zhao, Heilongjiang (CN); Xiangdong Lu, Heilongjiang (CN); Heng Zhang, Heilongjiang (CN); Yu Xu, Heilongjiang (CN); Weilong Liu, Heilongjiang (CN)

(73) Assignee: HARBIN ENGINEERING UNIVERSITY, Harbin (CN)

( * ) Notice: Subject to any disclaimer, the term of this patent is extended or adjusted under 35 U.S.C. 154(b) by 150 days.

(21) Appl. No.: 17/958,933

(22) Filed: Oct. 3, 2022

(65) Prior Publication Data
US 2023/0287851 A1    Sep. 14, 2023

(30) Foreign Application Priority Data

Mar. 9, 2022 (CN) .......................... 202210225083.9

(51) Int. Cl.
| | |
|---|---|
| *H01F 7/08* | (2006.01) |
| *F02M 51/06* | (2006.01) |
| *H01F 7/122* | (2006.01) |
| *H01F 7/16* | (2006.01) |

(52) U.S. Cl.
CPC .... *F02M 51/0621* (2013.01); *F02M 51/0635* (2013.01); *H01F 7/122* (2013.01); *H01F 7/1615* (2013.01)

(58) Field of Classification Search
CPC ............ F02M 51/0621; F02M 51/0635; H01F 7/122; H01F 7/1615
USPC ......................................................... 335/229
See application file for complete search history.

(56) References Cited

U.S. PATENT DOCUMENTS

| | | | | |
|---|---|---|---|---|
| 4,127,835 | A * | 11/1978 | Knutson | H01F 7/1615 335/229 |
| 7,746,202 | B2 * | 6/2010 | Hagen | H01H 33/6662 335/274 |
| 8,653,913 | B2 * | 2/2014 | Vellaiyanaicken | H01H 1/2025 335/229 |
| 8,710,945 | B2 * | 4/2014 | Wygnanski | H01F 7/1646 335/229 |

(Continued)

*Primary Examiner* — Shawki S Ismail
*Assistant Examiner* — Lisa N Homza (57) ABSTRACT

The present invention provides a permanent magnet-electromagnet synergistic coupling-based high-speed solenoid valve with a high dynamic response and a low rebound, including a shell and an iron core. The iron core is installed in the shell, an axial center through hole is formed in a middle of the iron core, a spring limiting sleeve is installed in the axial center through hole, an armature and a reset spring cavity are sequentially formed below the iron core, an upper portion of a valve rod is located in the spring limiting sleeve, an upper disc permanent magnet, a lower disc permanent magnet and a spring washer are arranged in the spring limiting sleeve, and a giant magnetostrictor is installed between the upper disc permanent magnet and the lower disc permanent magnet. By means of the present invention, electromagnetic force generated during pickup of the armature can be effectively improved.

8 Claims, 5 Drawing Sheets

(56) References Cited

U.S. PATENT DOCUMENTS

| | | | |
|---|---|---|---|
| 2013/0009731 A1* | 1/2013 | Fong | H01H 50/34 335/229 |
| 2013/0321107 A1* | 12/2013 | Palanisamy | H01H 51/2209 335/179 |
| 2016/0118174 A1* | 4/2016 | Bereschka | H01F 7/13 335/229 |
| 2016/0125990 A1* | 5/2016 | Strigerwald | H01F 7/17 335/229 |

* cited by examiner

FIG. 6

PERMANENT MAGNET-ELECTROMAGNET SYNERGISTIC COUPLING-BASED HIGH-SPEED SOLENOID VALVE WITH HIGH DYNAMIC RESPONSE AND LOW REBOUND

CROSS-REFERENCE TO RELATED APPLICATION

This application claims priority from the Chinese patent application 202210225083.9 filed Mar. 9, 2022, the content of which is incorporated herein in the entirety by reference.

TECHNICAL FIELD

The present invention relates to a diesel engine, in particular to a high-pressure common rail device for a diesel engine.

BACKGROUND

A high-pressure common rail fuel injection system can be adjusted to achieve an optimal fuel injection according to specific working conditions of engines due to its advantages of regular fuel injection, constant flexibly-adjustable fuel injection amount and fuel injection moments and the like, so that it is one of core systems for modern diesel engines in achieving high efficiency and low emission. As an execution component of a core component, namely a common rail fuel injector, of the high-pressure common rail system, a high-speed solenoid valve featuring in bridging electric signals and the fuel injection, by which an electronic control system can precisely adjust and control any fuel injection rule through the high-speed solenoid valve.

In order to achieve precise control over the fuel injection rule and more flexible multiple injections, the electronic control fuel system has very high technical requirements on a dynamic response characteristic of the high-speed solenoid valve. The high-speed solenoid valve is driven by "peak-hold" currents, and its process is as follows: at an initial stage when the solenoid valve is turned on, the control system adopts high drive voltages, so as to increase the lifting speed of an armature through high currents formed instantly, and adopts relatively low currents to keep a pickup state when the armature reaches a maximum lift, so that coil currents can rapidly return to zero when the armature is released to accelerate seating of the armature. The high-speed solenoid valve can be more rapidly turned on by instantly loading the high currents, however, as for an electronic control fuel system adopting high-frequency pulse injection, an excitation coil may generate large joule heat by too high drive currents, and an iron core generates large vortex losses by instantly loading the high drive currents, which may hinder rapid increase of electromagnetic force of the solenoid valve and delay rapid turning-on of the solenoid valve. In addition, the armature and a solenoid valve limiting component/valve seat may violently collide with each other during ascending/descending by more rapid turning-on/off, resulting in multiple irregular rebounds after the armature is limited, and the high-speed solenoid valve cannot be completely turned on/off at a time. As for a diesel electronic control fuel injection system, on one hand, response time of the high-speed solenoid valve to turning-on/off is required to be as short as possible, on the other hand, the high-speed solenoid valve is required to be stably turned on and seated, and these two contradictory technical indexes are hot and difficult points in current researches on the high-speed solenoid valve, and are also technical problems to be urgently solved.

SUMMARY

The present invention aims at providing a permanent magnet-electromagnet synergistic coupling-based high-speed solenoid valve with a high dynamic response and a low rebound, according to which, electromagnetic force generated during pickup of an armature can be effectively improved, the dynamic response speed is increased, rapid demagnetization of an iron core is facilitated, and the release speed of the armature is increased; and meanwhile, the rebound degree generated during pickup and seating of the armature can be reduced, and the working stability of the high-speed solenoid valve can be improved on the basis of improving its dynamic properties.

The objectives of the present invention are achieved as follows:

A permanent magnet-electromagnet synergistic coupling-based high-speed solenoid valve with a high dynamic response and a low rebound of the present invention, including a shell, an iron core, an armature, a reset spring cavity and a valve rod, wherein a fixing nut and a clamp nut are arranged at a top and a bottom of the shell respectively, the iron core is installed in the shell and provided with an annular groove, a coil framework is embedded into the annular groove, a coil is wound around the coil framework, an axial center through hole is formed in a middle of the iron core, a spring limiting sleeve is installed in the axial center through hole, an armature and a reset spring cavity are sequentially formed below the iron core, the valve rod penetrates through the reset spring cavity and the armature, an upper portion of the valve rod is located in the spring limiting sleeve; a part of the valve rod, located in the reset spring cavity, is sleeved with an armature reset spring, an upper disc permanent magnet, a lower disc permanent magnet and a spring washer are arranged in the spring limiting sleeve, a giant magnetostrictor is installed between the upper disc permanent magnet and the lower disc permanent magnet, a first buffer spring is installed between the upper disc permanent magnet and the fixing nut, a second buffer spring is installed between the lower disc permanent magnet and the spring washer, and a buffer air gap is formed between the spring washer and the valve rod.

The present invention may further include:

1. The upper disc permanent magnet and the lower disc permanent magnet both adopt axially radialized magnetization and have the same polarity.

2. An outer permanent magnet ring and an inner permanent magnet ring are embedded into an upper end face of the armature, and a buffer permanent magnet ring is embedded into an upper end face of the reset spring cavity.

3. The outer permanent magnet ring and the inner permanent magnet ring are aligned with the upper end face of the armature, the outer permanent magnet ring is located outside the inner permanent magnet ring, the buffer permanent magnet ring and the outer permanent magnet ring are aligned with each other up and down along a same axial direction, and a part of the buffer permanent magnet ring is located above the reset spring cavity and separated from the armature.

4. The outer permanent magnet ring and the inner permanent magnet ring both adopt axially radialized magnetization, but have opposite polarities, and the buffer permanent magnet ring and the outer permanent magnet ring both adopt axially radialized magnetization, but have opposite polarities.

5. The outer permanent magnet ring, the inner permanent magnet ring and the buffer permanent magnet ring are complete magnetic rings or evenly-spaced magnetic rings.

6. When the outer permanent magnet ring and the buffer permanent magnet ring are the evenly-spaced magnetic rings, their spacing angles are the same, and meanwhile, spacing angles of the outer permanent magnet ring and the inner permanent magnet ring are different.

7. An armature lift adjusting ring is arranged on an inner wall of the shell of a cavity where the armature is located.

The present invention has the following beneficial effects:

(1) by means of the structure that the inner permanent magnet ring and the outer permanent magnet ring are embedded into the armature in the present invention, permanent magnet-electromagnet synergistic coupling excitation can be achieved, a magnetic field with the direction the same as polarization directions of the inner permanent magnet ring and the outer permanent magnet ring is generated when currents pass through the coil in a specified direction, the magnetic field generated by the coil and magnetic fields generated by the inner permanent magnet ring and the outer permanent magnet ring are superposed, and the total magnetic flux penetrating through the armature is increased, so that axial electromagnetic attraction to the armature is increased, thereby improving the dynamic response of the high-speed solenoid valve;

(2) the giant magnetostrictor suffers from the action of a magnetic field of the center hole of the iron core to gradually extend axially when the valve rod ascends, and then gradually compresses the buffer springs, and the valve rod suffers from the action of flexible spring force, thereby achieving the low rebound against collision on the top of the armature;

(3) when the coil is converted into a non-powered state from a power-on state, the giant magnetostrictor is gradually shortened to a normal height from an extended state, and acting force of the buffer springs is large at first, so that self-locking is not generated, the falling speed of the armature is increased, and eddy current formed by a magnetic field generated by a magnetic domain of the giant magnetostrictor and residual eddy current in the iron core have opposite directions, so demagnetization of the iron core can be accelerated, so as to accelerate seating of the armature; and (4) in the seating process of the armature, flexibility of repulsion, acting on the armature, of the buffer permanent magnet ring is improved, so as to reduce the rebound during seating of the armature.

BRIEF DESCRIPTION OF THE DRAWINGS

FIG. 4 is a schematic diagram of a permanent magnet-electromagnet synergistic coupling-based magnetic circuit when a coil is powered on;

DETAILED DESCRIPTION OF THE PRESENT INVENTION

The present invention will be described in more details with examples below with reference to drawings:

With reference to FIGS. 1-6, a permanent magnet-electromagnet synergistic coupling-based high-speed solenoid valve with a high dynamic response and a low rebound of the present invention includes a shell 1, an iron core 2, a coil 3, a coil framework 4, an outer permanent magnet ring 5, an inner permanent magnet ring 6, a buffer permanent magnet ring 7, an armature 8, an armature reset spring 9, a fixing nut 10, a giant magnetostrictive assembly 11, a spring limiting sleeve 12, a valve rod 13, an armature upper snap ring 14, an armature lift adjusting ring 15, an armature lower snap ring 16, a reset spring cavity 17, a reset spring washer 18 and a clamp nut 19. The fixing nut 10 and the clamp nut 19 are arranged at a top and a bottom of the shell 1 respectively, and an annular groove is formed in the iron core 2 to form a main magnetic pole and a secondary magnetic pole of the iron core. The coil 3 is wound in the coil framework 4, a radial width of the coil framework 4 is equal to a width of the annular groove of the iron core, an axial height is equal to or less than a depth of the annular groove of the iron core, and the coil framework 4 is embedded into the annular groove of the iron core. An axial center through hole is formed in a middle of the iron core 2, center holes are also formed in centers of the clamp nut 19 and the reset spring cavity 17, the valve rod 13 penetrates through the clamp nut 19 and the reset spring cavity 17, and a top of the valve rod 13 is located in the center hole of the iron core. The armature lift adjusting ring 15 is arranged between the iron core 2 and the reset spring cavity 17, the armature reset spring 9 is located in the reset spring cavity 17, the reset spring washer 18 is in threaded connection with the valve rod 13, and an axial distance between an upper surface of a top end of the valve rod and the spring washer is less than that between the armature and the iron core. The armature 8 is installed on an upper part of the valve rod 13, the outer permanent magnet ring 5 and the inner permanent magnet ring 6 are embedded into a top of the armature 8, and the outer permanent magnet ring 5 and the inner permanent magnet ring 6 both adopt axially radialized magnetization, but have opposite polarities. Upper surfaces of the outer permanent magnet ring 5 and the inner permanent magnet ring 6 are aligned with an upper surface of the armature 8, lower surfaces of the outer permanent magnet ring 5 and the inner permanent magnet ring 6 are not exceed a lower surface of the armature 8, a diameter of an inner ring of the outer permanent magnet ring 5 is more than that of an outer ring of the coil 3, and a diameter of an outer ring of the inner permanent magnet ring 6 is less than that of an inner ring of the coil 3. The buffer permanent magnet ring 7 is embedded into a top of the reset spring cavity 17, the buffer permanent magnet ring 7 and the outer permanent magnet ring 5 both adopt axially radialized magnetization, but have opposite polarities, a diameter of an inner ring of the buffer permanent magnet ring 7 is equal to that of the inner ring of the outer permanent magnet ring 5, a diameter of an outer ring of the buffer permanent magnet ring 7 is equal to that of an outer ring of the outer permanent magnet ring 5, the buffer permanent magnet ring 7 and the outer permanent magnet ring 5 are aligned with each other up and down along a same axial direction, the buffer permanent magnet ring 7 are partially embedded into the reset spring cavity 17, an upper surface of the buffer permanent magnet ring 7 is higher than an upper surface of the reset spring cavity 17, but does not make contact with the lower surface of the armature 8, and an embedded part of the buffer permanent magnet ring 7 is in interference fit with the reset spring cavity 17. The outer permanent magnet ring 5, the inner permanent magnet ring 6 and the buffer permanent magnet ring 7 may be complete magnetic rings, or evenly-spaced magnetic rings with the same spacing angle, or evenly-spaced permanent magnet rings; wherein spacing angles of the outer permanent magnet ring 5 and the buffer permanent magnet ring 7 are the same, but spacing angles of the outer permanent magnet ring 5 and the inner permanent magnet ring 6 are different. A giant magnetostrictive assembly 11 is arranged in the axial center through hole of the iron core 2, and includes a giant magnetostrictor 21, buffer springs 23, an upper disc permanent magnet 20, a lower disc permanent magnet 22 and a spring washer 24, the upper disc permanent magnet 20 and the lower disc permanent magnet 22 are arranged at upper and lower ends of the giant magnetostrictor 21 respectively, the upper disc permanent magnet 20 and the lower disc permanent magnet 22 both adopt axially radialized magnetization, and have the same polarity, the buffer springs 23 are arranged at a top of the upper disc permanent magnet 20 and a bottom of the lower disc permanent magnet 22, the buffer spring 23 at the bottom of the lower disc permanent magnet 22 is provided with the spring washer 24, the spring washer 24 is clamped at the spring limiting sleeve 12, and the buffer springs 23 are both in compressed states.

Figure 1:
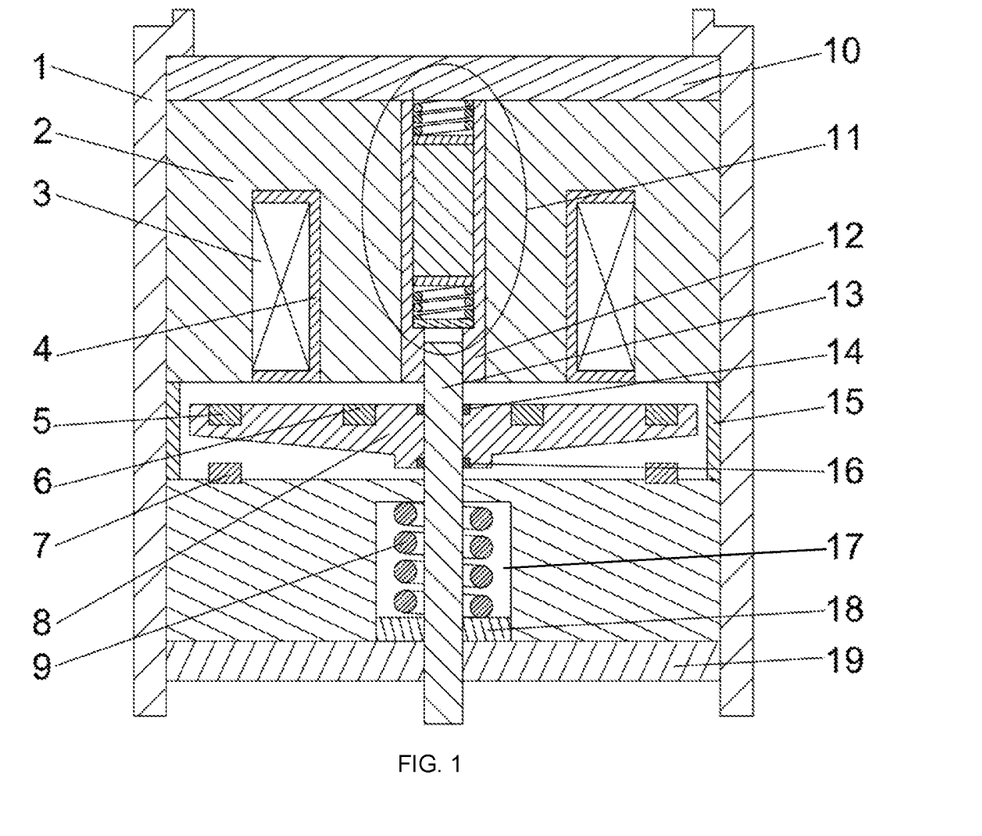
FIG. 1 is a structural schematic diagram of the solenoid valve according to the present invention.
Figure 2:
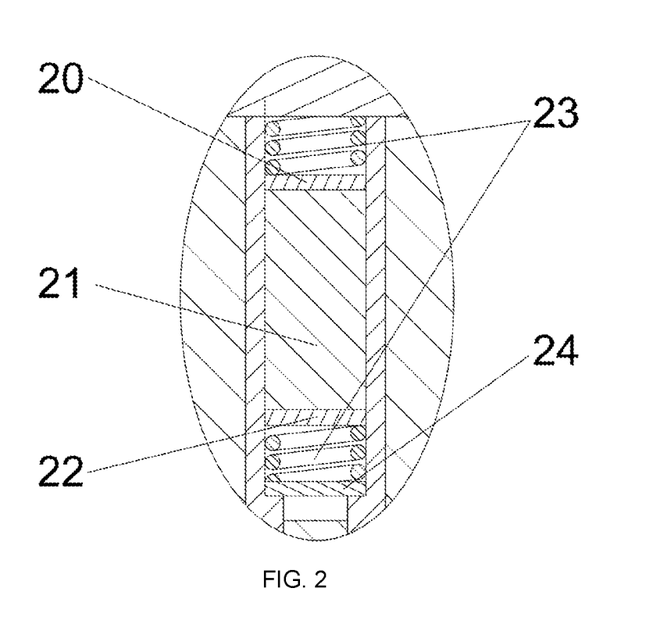
FIG. 2 is a partial enlarged diagram of a giant magnetostrictive assembly.
Figure 3A:
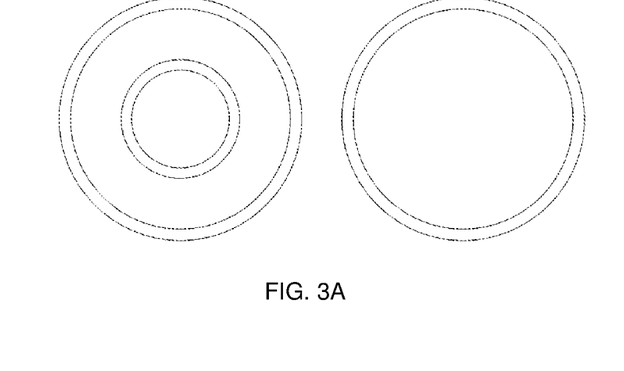
FIG. 3a shows complete magnetic rings.
Figure 3B:
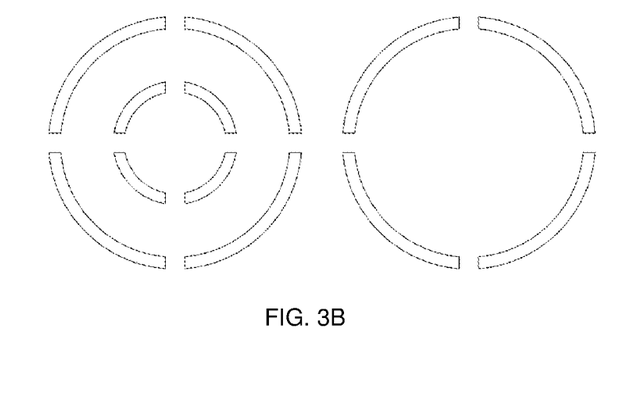
FIG. 3b shows magnetic rings evenly spaced in fourths.
Figure 3C:
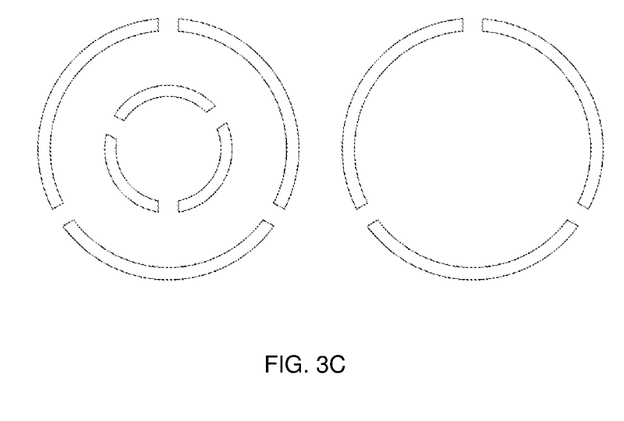
FIG. 3c shows magnetic rings evenly spaced in thirds.
Figure 4:
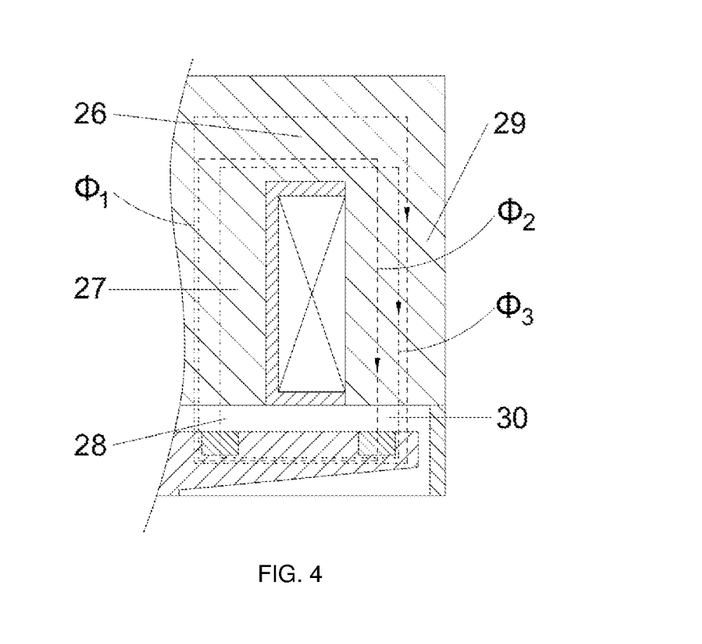

With reference to FIG. 4, the principle of a permanent magnet-electromagnet synergistic coupling-based magnetic circuit of the present invention is as follows: when currents capable of generating a magnetic field with the direction the same as polarization directions of the inner permanent magnet ring 6 and the outer permanent magnet ring 5 pass through the coil 3, the coil 3 generates a magnetic flux φ1 passing through a closed circuit consisting of the main magnetic pole 27, a magnet yoke 26, the secondary magnetic pole 29, a secondary magnetic pole air gap 30, the armature 8 and a main magnetic pole air gap 28, the outer permanent magnet ring 5 generates a magnetic flux φ2 passing through a closed circuit consisting of the armature 8, the main magnetic pole air gap 28, the main magnetic pole 27, the magnet yoke 26, the secondary magnetic pole 29 and the secondary magnetic pole air gap 30, the inner permanent magnet ring 6 generates a magnetic flux φ3 passing through a closed circuit consisting of the main magnetic pole air gap 28, the main magnetic pole 27, the magnet yoke 26, the secondary magnetic pole 29, the secondary magnetic pole air gap 30 and the armature 8, and the three magnetic fluxes are superposed in a synergistic coupling manner, so as to make magnetic induction intensity at a working air gap between the armature 8 and the iron core 2 enhanced, and the total magnetic flux penetrating through the armature 8 is increased, so that axial electromagnetic attraction to the armature 8 is increased, thereby improving the dynamic response of the high-speed solenoid valve.

Figure 5:
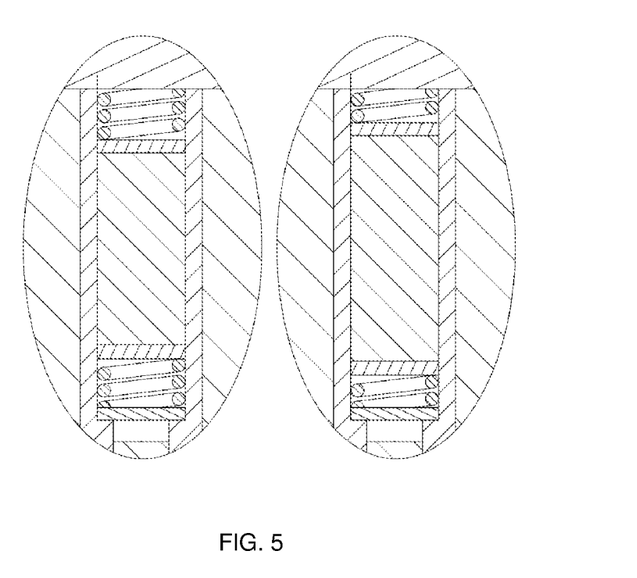
FIG. 5 are structural schematic diagrams of a giant magnetostrictor when a coil is not powered on (left) and when the coil is powered on (right)
Figure 6:
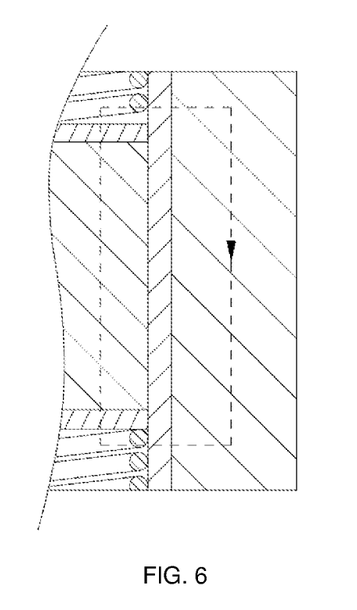
FIG. 6 is a schematic diagram of a magnetic circuit of a giant magnetostrictor when a coil is in non-powered state.

With reference to FIG. 5 and FIG. 6, the working principle of the giant magnetostrictive assembly of the present invention is as follows: (1) after the coil 3 is powered on, the upper disc permanent magnet 20 and the lower disc permanent magnet 22 in the giant magnetostrictive assembly 11 radially slightly drag a magnetic field in the main magnetic pole 27, so that the giant magnetostrictor 21 suffers from the action of an axial magnetic field at the center hole of the iron core 2 to gradually extend axially when the valve rod 13 ascends, and then gradually compress the buffer springs 23, and the valve rod 13 suffers from the action of flexible spring force, thereby achieving the low rebound against collision on the top of the armature 8; (2) when the coil 3 is converted into a non-powered state from a power-on state, the giant magnetostrictor 21 is gradually shortened to a normal height from an extended state, and self-locking is not generated as acting force of the buffer springs 23 is large at first, and the falling speed of the armature 8 is increased; eddy current formed by a magnetic field generated by a magnetic domain of the giant magnetostrictor 21 and residual eddy current in the iron core 2 have opposite directions, so as to accelerate demagnetization of the iron core 2; and in the seating process of the armature 8, flexibility of repulsion, acting on the armature 8, of the buffer permanent magnet ring 7 is improved, so as to reduce the rebound during seating of the armature 8.

What is claimed is:

1. A permanent magnet-electromagnet synergistic coupling-based high-speed solenoid valve with a high dynamic response and a low rebound, comprising a shell, an iron core, an armature, a reset spring cavity and a valve rod, wherein a fixing nut and a clamp nut are arranged at a top and a bottom of the shell respectively, the iron core is installed in the shell and provided with an annular groove, a coil framework is embedded into the annular groove, a coil is wound around the coil framework, an axial center through hole is formed in a middle of the iron core, a spring limiting sleeve is installed in the axial center through hole, an armature and a reset spring cavity are sequentially formed below the iron core, the valve rod penetrates through the reset spring cavity and the armature, an upper portion of the valve rod is located in the spring limiting sleeve, a part of the valve rod, located in the reset spring cavity, is sleeved with an armature reset spring, an upper disc permanent magnet, a lower disc permanent magnet and a spring washer are arranged in the spring limiting sleeve, a giant magnetostrictor is installed between the upper disc permanent magnet and the lower disc permanent magnet, a first buffer spring is installed between the upper disc permanent magnet and the fixing nut, a second buffer spring is installed between the lower disc permanent magnet and the spring washer, and a buffer air gap is formed between the spring washer and the valve rod.

2. The permanent magnet-electromagnet synergistic coupling-based high-speed solenoid valve with the high dynamic response and the low rebound according to claim 1, wherein the upper disc permanent magnet and the lower disc permanent magnet both adopt axially radialized magnetization and have the same polarity.

3. The permanent magnet-electromagnet synergistic coupling-based high-speed solenoid valve with the high dynamic response and the low rebound according to claim 1, wherein an outer permanent magnet ring and an inner permanent magnet ring are embedded into an upper end face of the armature, and a buffer permanent magnet ring is embedded into an upper end face of the reset spring cavity.

4. The permanent magnet-electromagnet synergistic coupling-based high-speed solenoid valve with the high dynamic response and the low rebound according to claim 3, wherein the outer permanent magnet ring and the inner permanent magnet ring are aligned with the upper end face of the armature, the outer permanent magnet ring is located outside the inner permanent magnet ring, the buffer permanent magnet ring and the outer permanent magnet ring are aligned with each other up and down along a same axial direction, and a part of the buffer permanent magnet ring is located above the reset spring cavity and separated from the armature.

5. The permanent magnet-electromagnet synergistic coupling-based high-speed solenoid valve with the high dynamic response and the low rebound according to claim 3, wherein the outer permanent magnet ring and the inner permanent magnet ring both adopt axially radialized magnetization, but have opposite polarities, and the buffer permanent magnet ring and the outer permanent magnet ring both adopt axially radialized magnetization, but have opposite polarities.

6. The permanent magnet-electromagnet synergistic coupling-based high-speed solenoid valve with the high dynamic response and the low rebound according to claim 3, wherein the outer permanent magnet ring, the inner permanent magnet ring and the buffer permanent magnet ring are complete magnetic rings or evenly-spaced magnetic rings.

7. The permanent magnet-electromagnet synergistic coupling-based high-speed solenoid valve with the high dynamic response and the low rebound according to claim 6, wherein when the outer permanent magnet ring and the buffer permanent magnet ring are the evenly-spaced magnetic rings, spacing angles of the outer permanent magnet ring and the buffer permanent magnet ring are the same, and meanwhile, spacing angles of the outer permanent magnet ring and the inner permanent magnet ring are different.

8. The permanent magnet-electromagnet synergistic coupling-based high-speed solenoid valve with the high dynamic response and the low rebound according to claim 1, wherein an armature lift adjusting ring is arranged on an inner wall of the shell of a cavity where the armature is located.

* * * * *